Sept. 10, 1929.　　A. E. OSTRANDER　　1,727,727
PERISCOPE
Filed March 26, 1926　　2 Sheets-Sheet 1
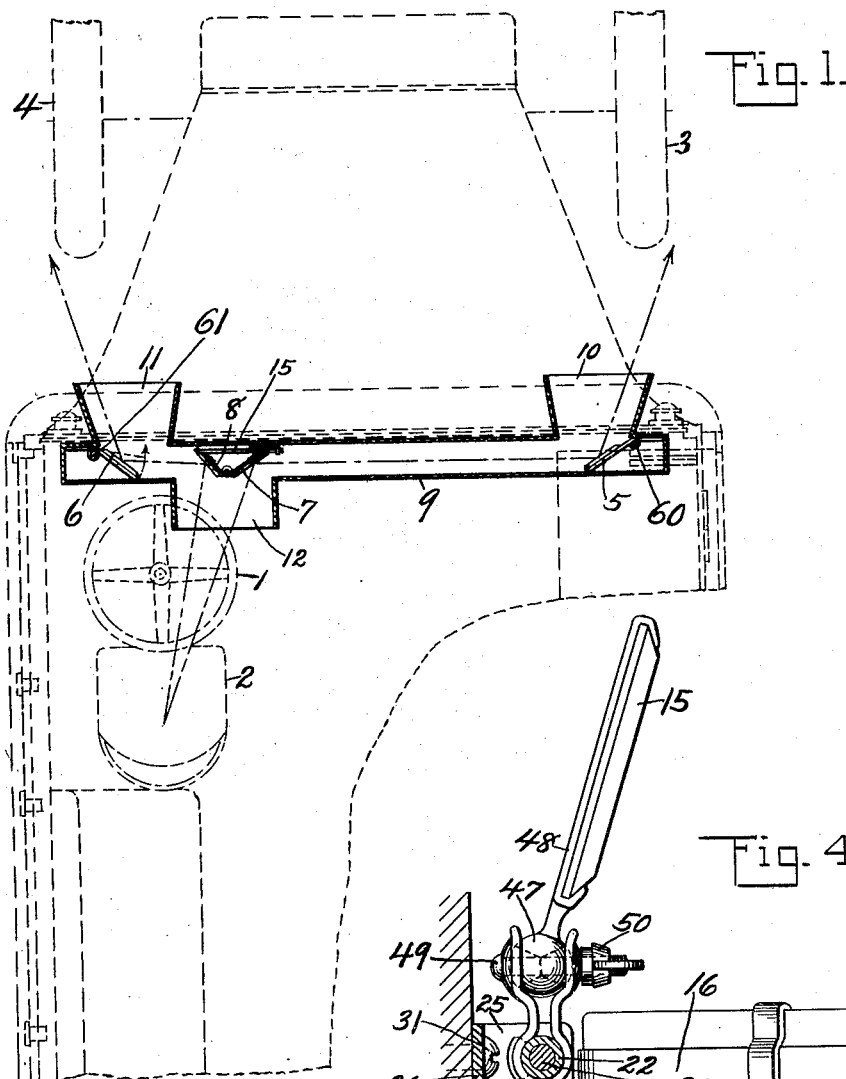
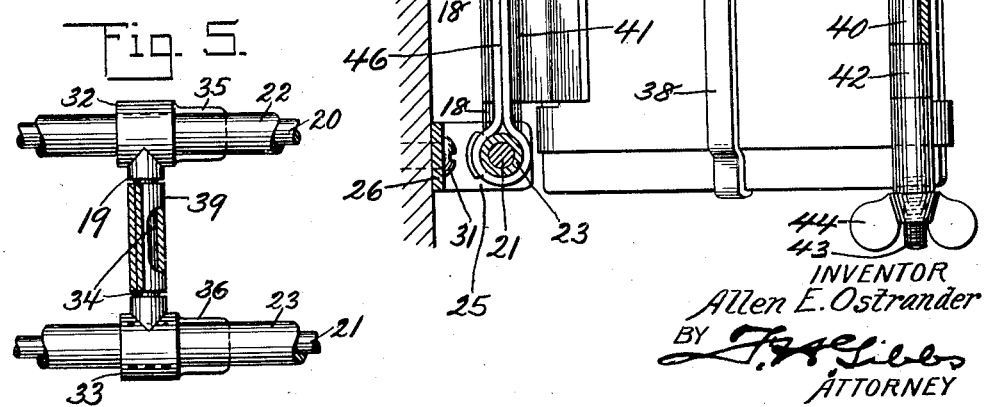
INVENTOR
Allen E. Ostrander
BY
ATTORNEY

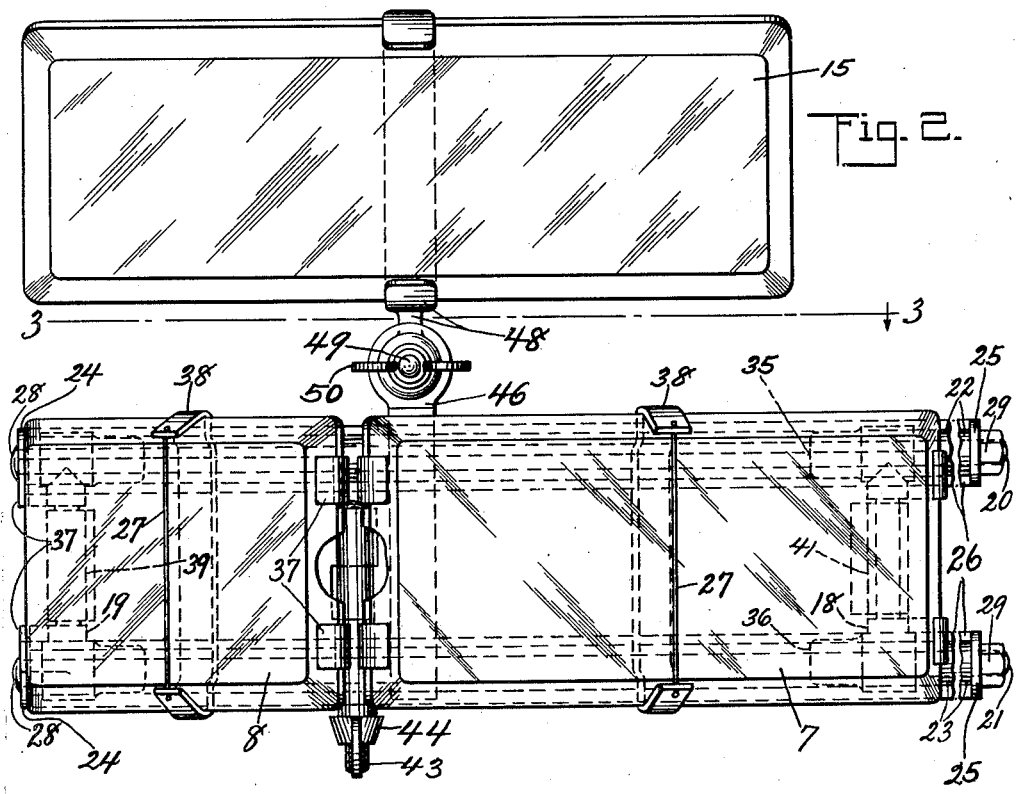
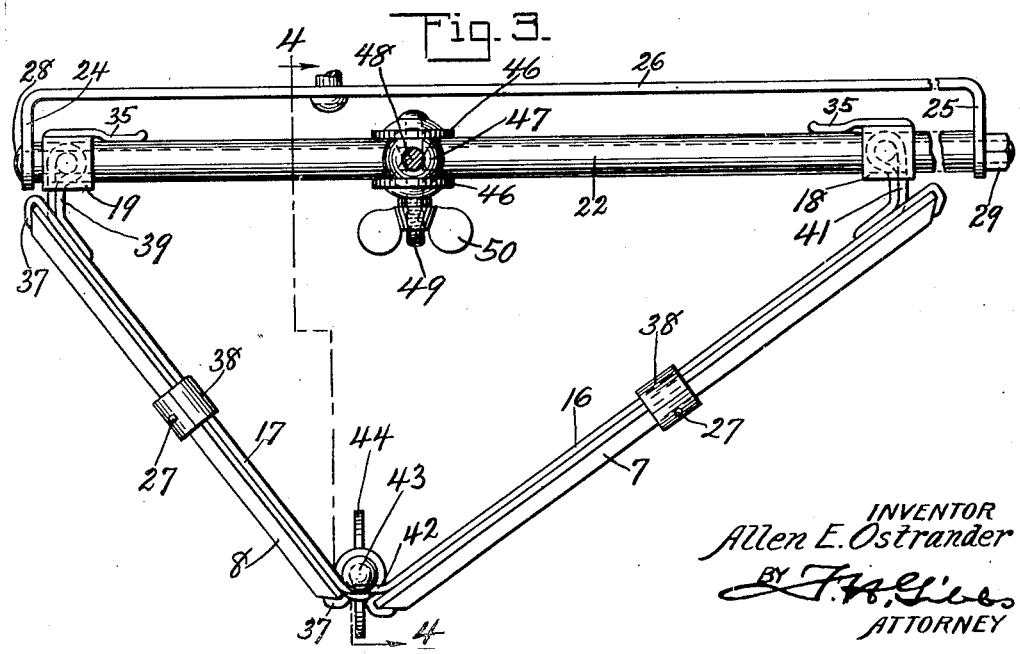

Patented Sept. 10, 1929.

1,727,727

UNITED STATES PATENT OFFICE.

ALLEN E. OSTRANDER, OF BRONXVILLE, NEW YORK, ASSIGNOR TO AMERICAN CAR AND FOUNDRY MOTORS COMPANY, OF NEW YORK, N. Y., A CORPORATION OF DELAWARE.

PERISCOPE.

Application filed March 26, 1926. Serial No. 97,649.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Figure 1 is a sectional plan view of a periscope structure constructed in accordance with my invention and shown in position on a motor bus;

Fig. 2 is an elevational view of a portion of the periscope structure shown in Fig. 1;

Fig. 3 is a plan view of the structure shown in Fig. 2;

Fig. 4 is a sectional view along the line 4—4 of Fig. 3, and

Fig. 5 is a view showing the mounting of the cross-heads shown in Figs. 2 and 3.

One object of the invention is to provide a periscope structure that shall give the driver of a motor vehicle or bus a clear view of the road at each side of the front of the bus and also a view of the road back of the motor bus from the driving position.

Another object of the invention is to provide a system of mirrors, adjustable by the driver with ease from the driving position, for giving the driver a clear view of the road at each side of the front of the bus.

A further object of the invention is to provide two mirrors of a mirror system with a pivotal sliding support at one end of each of them and a pivotal connection between them at the opposite ends thereof whereby the angular positions of the mirrors may be adjusted with ease.

In driving many motor vehicles, and particularly in driving motor buses, trouble is encountered by the driver in obtaining a view of the road at the sides of the front of the bus. In most cases, it is impossible for the driver of a large motor bus to see the road at the sides of the bus and in such case he must rely solely on his judgment in avoiding obstacles and defects in the road close to the car. Moreover, in driving a large bus on a narrow road under normal conditions it is impossible for the driver to obtain a view of the road at the sides of the front of the bus. In a bus provided with a periscope structure constructed in accordance with the invention the driver is given a view of the road at each side of the car when in driving position. Moreover, the periscope structure may be set to give the driver of the bus a view on the right side of the road to show the wheel clearance and the relative proximity to the road side of ditches or interfering obstacles. On the left side of the road the driver may be given a view of objects further away from the bus to determine if the road is clear and if it is safe to pass a vehicle going in the same direction as the bus.

Referring to the drawings and particularly to Fig. 1, a portion of a motor bus is illustrated in dotted lines and a periscope structure constructed in accordance with the invention is shown in position on the bus. The steering wheel 1 and the driver's seat 2 are shown in the customary position on the left side of the bus. When the driver is in the driving position it is apparent that it is difficult for him, not only to obtain a view of the road adjacent to the right front wheel 3 but also to obtain a view of the road adjacent to the left front wheel 4. In order to give the driver a view of the road adjacent the front wheels 3 and 4, two side mirrors 5 and 6 are combined with two central or side view mirrors 7 and 8 within a periscope tube 9.

The periscope tube 9 is mounted in a convenient position at the top front part of the body of the bus and is provided with three ports or openings 10, 11 and 12. The openings 10 and 11 are positioned at opposite sides of the bus and are adapted to expose the road adjacent the wheels 3 and 4 to the mirrors 5 and 6, which are positioned back of the openings. The mirrors 5 and 6 are angularly positioned so as to reflect views of the road horizontally towards the mirrors 7 and 8. Preferably the mirrors 5 and 6 are adjustably supported in the periscope tube by means of hinges 60 and 61. Pivotally supporting the mirrors on the tube facilitates the application of the periscope to various types, widths and styles of bus bodies. The mirrors may not only be set to give the driver a view of wheel clearance but may be set to give the driver a view of objects further away to determine if the road is clear for passing a vehicle going in the same direction. Thus, the mirrors may be set to give the driver a view of wheel clearance at the right side and a view further along the road on the left side. The opening 12 in the periscope tube 9 is located adjacent to the driver in order to permit the driver to see the mirrors 7 and 8 and obtain a reflected view of the road adjacent to the front wheels 3 and 4. The opening 12 in the periscope tube also permits the driver to see the rear view mirror 15 for obtaining a view of the road back of the bus. The opening 12 in the periscope tube is hooded for eliminating the glare from the rays of the sun and to give the driver a clear view of the images reflected by the mirrors 5 and 6.

Referring to Figs. 2, 3 and 4, the mirrors 7 and 8 are shown carried by two supporting plates 16 and 17. The two supporting plates 16 and 17 are respectively mounted on two cross-heads 18 and 19 which are slidably mounted on two supporting bars or bolts 20 and 21. Preferably, the cross-heads are directly mounted on tubes 22 and 23 which are carried by the bars 20 and 21. The arms 24 and 25 of brackets 26 are positioned between the heads 28 of the bolts 20 and 21 and nuts 29 which are secured to the ends of the bolts. The brackets 26 are secured in position on the front of the bus or to the side of the periscope tube by means of screws 31.

The cross-head 19, shown in Fig. 5 of the drawings, comprises two T-shaped members 32 and 33 which are connected by a tube 34. The members 32 and 33 are slidably mounted on the tubes 22 and 23 and carry spring members 35 and 36. The spring members 35 and 36 frictionally engage the tubes 22 and 23 in order to exert a force tending to hold the cross-head in an adjusted position. The cross head 18 which is connected to the plate 16 is similar in construction to the cross-head 19 and a description thereof is deemed unnecessary.

The plate 17 is provided with end portions 37 which are bent to overlap a portion of the bevelled edge of the mirror 8 as shown in Figs. 2 and 3 of the drawings. Moreover, a clamp 38 extends across the plate 17 and overlaps a portion of the mirror 8 as shown in Figs. 2 and 3 of the drawings. The clamp 38 is slidable along the mirror and carries a wire extending across the face of the mirror. The wire is designed to form a relatively narrow edge or hair line 27 on the face of the mirror. A similar clamp 38 with a hair line 27 is provided for the mirror 7. After the angular adjustment of the mirrors 7 and 8 in the manner hereinafter set forth, the hair lines 27 are set so that the driver may steer to clear an object in the road. The hair lines are used as reference lines to determine if the bus will clear objects in the road.

A hinge member 39 located at one end of the plate 17 is looped around the tube 34 of the cross-head 19 to provide a pivotal support for the mirror 8. A second hinge member 40 is formed at the opposite end of the plate 17. The hinge member 40 is constructed by forming loops from projecting end portions of the plate 17. The plate 16 is provided with a hinge member 41 which is connected to the cross-head 18 and a hinge member 42 which is connected to the hinge member 40 on the plate 17 by means of a pin 43. A thumb nut 44 is threaded on the pin 43 for clamping the hinge members 40 and 42 together to secure the two plates and the mirrors carried thereby in a set position. By releasing the thumb nut 44 it is apparent the driver from his driving position can adjust the mirrors 7 and 8 to correctly reflect a view of the road adjacent the front wheels 3 and 4.

The rear view mirror 15 is carried by clamp 48 which is supported on a bracket 46. The bracket 46 embraces the two tubes 22 and 23 as shown in Fig. 4 of the drawings and the ends thereof are clamped against a ball 47 forming a part of a clamp 48. The ends of the bracket 46 are clamped against the ball 47 and the tubes by means of a bolt 49. The bolt projects through the ball and a thumb nut 50 is screwed on the end thereof. The opening for the bolt 49 through the ball 47 is countersunk as shown in Fig. 4 in order to permit adjustment of the mirror 15. By loosening the thumb nut 50 it is apparent a quick adjustment of the rear view mirror may be effected.

What is claimed is:

1. In combination, two mirrors, two supporting rods, two cross-heads slidably mounted on said rods, means carried by the cross-heads tending to hold them in an adjusted position, means for rotatably supporting one end of each mirror on said cross-heads, and a hinge connection between the opposite ends of said mirrors.

2. In combination, two mirrors, two supporting rods, two cross-heads slidably mounted on said rods, means for rotatably supporting one end of each mirror on said cross-heads, a hinge connection between the opposite ends of said mirrors, and means for locking said hinge connection.

3. In combination, side view mirrors, a rear view mirror, two supporting rods, two cross-heads slidably mounted on said rods, means for rotatably supporting one end of each side view mirror on said cross heads, a hinge connection between the opposite ends of the side view mirrors, and an adjustable support for said rear view mirror on said rods.

4. In combination, two supporting rods, a rear view mirror, an adjustable support for said rear view mirror on said rods, two cross heads slidably mounted on said rods and positioned on opposite sides of said adjustable support, spring friction means for holding the cross-heads in a set position, two side view mirrors, means for rotatably supporting one end of each of the two side view mirrors on said cross-heads, and a hinge connection between the opposite ends of the side view mirrors.

5. In combination, two mirrors, two plates for supporting said mirrors, two slidably mounted cross-heads, a hinge member at each end of each supporting plate, the hinge members at one end of the two plates being pivotally secured to said cross-heads, and a pin for pivotally securing the hinge members at the opposite ends of the two supporting plates.

In witness whereof I have hereunto set my hand.

ALLEN E. OSTRANDER.